United States Patent [19]
Horita et al.

[11] Patent Number: 5,483,504
[45] Date of Patent: Jan. 9, 1996

[54] HEAD LOADING MECHANISM OF DISK APPARATUS

[75] Inventors: Masami Horita, Hoya; Koji Naraoka, Sayama, both of Japan

[73] Assignee: Teac Corp., Japan

[21] Appl. No.: 147,686

[22] Filed: Nov. 4, 1993

[30] Foreign Application Priority Data

Nov. 16, 1992 [JP] Japan .................... 4-305598

[51] Int. Cl.⁶ .................... G11B 5/54; G11B 21/20; G11B 21/22
[52] U.S. Cl. .................... 369/13; 360/105
[58] Field of Search .................... 360/105, 104, 360/98.01, 99.02, 99.06; 369/13

[56] References Cited

U.S. PATENT DOCUMENTS

| | | | |
|---|---|---|---|
| 4,379,315 | 4/1983 | Schuler | 360/105 |
| 4,972,281 | 11/1990 | Fujioka | 360/105 |
| 4,980,787 | 12/1990 | Iwanaga | 360/105 |
| 5,196,975 | 3/1993 | Inoue | 360/105 |
| 5,291,361 | 3/1994 | Yokota | 360/105 |

FOREIGN PATENT DOCUMENTS

| | | |
|---|---|---|
| 319159 | 1/1991 | Japan . |
| 319160 | 1/1991 | Japan . |
| 3104068 | 5/1991 | Japan . |

*Primary Examiner*—Robert S. Tupper
*Assistant Examiner*—William R. Korzuch
*Attorney, Agent, or Firm*—Andrus, Sceales, Starke & Sawall

[57] ABSTRACT

A head loading mechanism of a disk apparatus includes an arm for holding a magnetic head at a leading edge of the arm, the arm longitudinally extending in a radial direction of a magneto-optical disk toward the center of the disk and having a base portion and a plurality of laterally projecting portions between the leading edge and the base portion, a first supporting part for supporting the base portion of the arm, a second supporting part for supporting the laterally projecting portions of the arm when the disk is placed in a read/write position where information is recorded on or reproduced from the disk, and an arm raising part for vertically rotating the arm around the base portion supported by the first supporting part when the disk is moved from the read/write position to an insertion position, allowing the magnetic head to be placed in an unloaded position in which the magnetic head is separate from the disk.

8 Claims, 7 Drawing Sheets

HEAD LOADING MECHANISM OF DISK APPARATUS

BACKGROUND OF THE INVENTION

1. Field of the Invention

The present invention generally relates to a disk apparatus, and more particularly to a head loading mechanism of a disk apparatus by which a head is placed in a loaded position on a magneto-optical disk when information is recorded on or reproduced from the disk by using the head, and the head is placed in an unloaded position that is separate from the disk before the disk is inserted into or ejected from the disk apparatus.

2. Description of the Prior Art

In a magneto-optical recording method, data is represented as the direction or intensity of magnetization of a disk material. A laser light beam is irradiated to one surface of a disk of magnetic material and the other surface of the disk is magnetized. The direction or intensity of magnetization of the disk material is varied by using a head in accordance with a data signal, so that information indicated by the data signal is recorded on the disk.

Two kinds of magneto-optical recording methods are known: one is the optical modulation recording and the other is the electromagnetic modulation recording. The optical modulation recording method is the earlier one of the two methods, and this method is applied to a magneto-optical disk apparatus for a practical use. In the optical modulation recording method, the intensity of laser light is modulated according to the data signal, and a recording medium is exposed to the modulated laser light so that the information is recorded on the recording medium.

However, it is difficult to overwrite data to the recording medium by using the optical modulation recording method. In overwriting, the recorded data on a disk is erased and new data is written to the disk.

On the other hand, the overwriting can be easily carried out using the electromagnetic modulation recording method. It is expected that the electromagnetic modulation recording method will be more widely spread. In the electromagnetic modulation recording method, the direction of magnetization of the recording medium is varied by a magnetic head in accordance with the data signal so that the information is recorded on the disk by using the magnetic head and an optical head.

In order to carry out the electromagnetic modulation recording method, it is necessary for the magnetic head to produce a relatively high magnetic field (in the order of 200 to 300 Oe) in the magnetic film of the recording medium. In order to increase the recording density of the disk, it is necessary to change the direction of magnetization of the disk material at higher rates. In order for realizing such improvements relating to the electromagnetic modulation recording method, several head loading mechanisms for magneto-optical disk apparatus have been proposed.

In a magneto-optical disk apparatus of the type in which the recording medium can be exchanged, a head loading mechanism is used for placing a head in a loaded position on a disk and for placing the head in an unloaded position that is separate from the disk. Before the disk is positioned to a read/write position in the apparatus or before the disk is ejected from the apparatus, the head is unloaded from the disk by the head loading mechanism. After the disk is placed in the read/write position of the apparatus, the head is loaded onto the disk by the head loading mechanism so that information is recorded on or reproduced from the disk by means of the head.

Japanese Laid-Open Patent Publication Nos. 3-19159 and 3-19160 disclose a head loading mechanism for a magneto-optical recording device of the type in which a disk as the recording medium is changeable. In this head loading mechanism, an elastic member for supporting a magnetic head is repeatedly subjected to elastic deformation when the recording medium is changed.

In the head loading mechanism disclosed in the above mentioned publications, the loaded position of the magnetic head relative to the disk may significantly vary if the disk is changed many times to subject the elastic member to the repeated deformation. Variations in the loaded position of the magnetic head relative to the disk may cause problems with the data recording or may damage the head by the interference between the head and the disk cassette. Thus, this head loading mechanism has a problem in that the reliability of the magneto-optical recording is somewhat lowered because of the use of the elastic member.

Japanese Laid-Open Patent Publication No. 3-104068 discloses a head loading mechanism for a magneto-optical disk apparatus. In this head loading mechanism disclosed in this publication, the magnetic head is supported by a thin leaf spring when the head is in its unloaded condition for the changing of a disk. The leaf spring is supported by upper and lower plates and other parts when the head is in its loaded condition, so that the magnetic head is supported by the leaf spring and the additional parts. The rigidity of the head loading mechanism for supporting the magnetic head is thus increased with the additional parts.

However, the weight of the head loading mechanism disclosed in the above mentioned publication is raised by the additional parts, which will make the goal of high disk access speed more difficult to achieve. Also, the head loading mechanism disclosed in this publication requires many additional parts and the structure is complicated. Thus, the manufacturing cost will become high.

SUMMARY OF THE INVENTION

Accordingly, it is a general object of the present invention to provide an improved head loading mechanism of a magneto-optical disk apparatus in which the above described problems are eliminated.

Another, more specific object of the present invention is to provide a head loading mechanism which has a simple structure with no need of assembling a large number of parts to make up the head loading mechanism, and is highly rigid and lightweight so as to realize the magnetic head having a high-speed access to the magneto-optical disk.

The above mentioned objects of the present invention are achieved by a head loading mechanism of a disk apparatus which includes an arm for holding a magnetic head at a leading edge of the arm, the arm longitudinally extending in a radial direction of a magneto-optical disk toward the center of the disk and having a base portion and a plurality of laterally projecting portions between the leading edge and the base portion, a first supporting part for supporting the base portion of the arm, a second supporting part for supporting the laterally projecting portions of the arm when the disk is placed in a first position in which information is recorded on or reproduced from the disk, and an arm raising part for vertically rotating the arm around the base portion supported by the first supporting part when the disk is moved from the first position to a second position, allowing the magnetic head to be placed in an unloaded position in which the head is separate from the disk.

According to the present invention, a head loading mechanism having a simple structure can be produced with no need of assembling many parts to make up the head loading mechanism. The head loading mechanism according to the present invention can be easily applied to a magneto-optical disk apparatus. The head loading mechanism according to the present invention can be very rigid and lightweight so as to realize the magnetic head having a high-speed access to the magneto-optical disk.

BRIEF DESCRIPTION OF THE DRAWINGS

The above and other objects, features and advantages of the present invention will be more apparent from the following detailed description when read in conjunction with the accompanying drawings in which.

DESCRIPTION OF THE PREFERRED EMBODIMENTS

Figure 1:
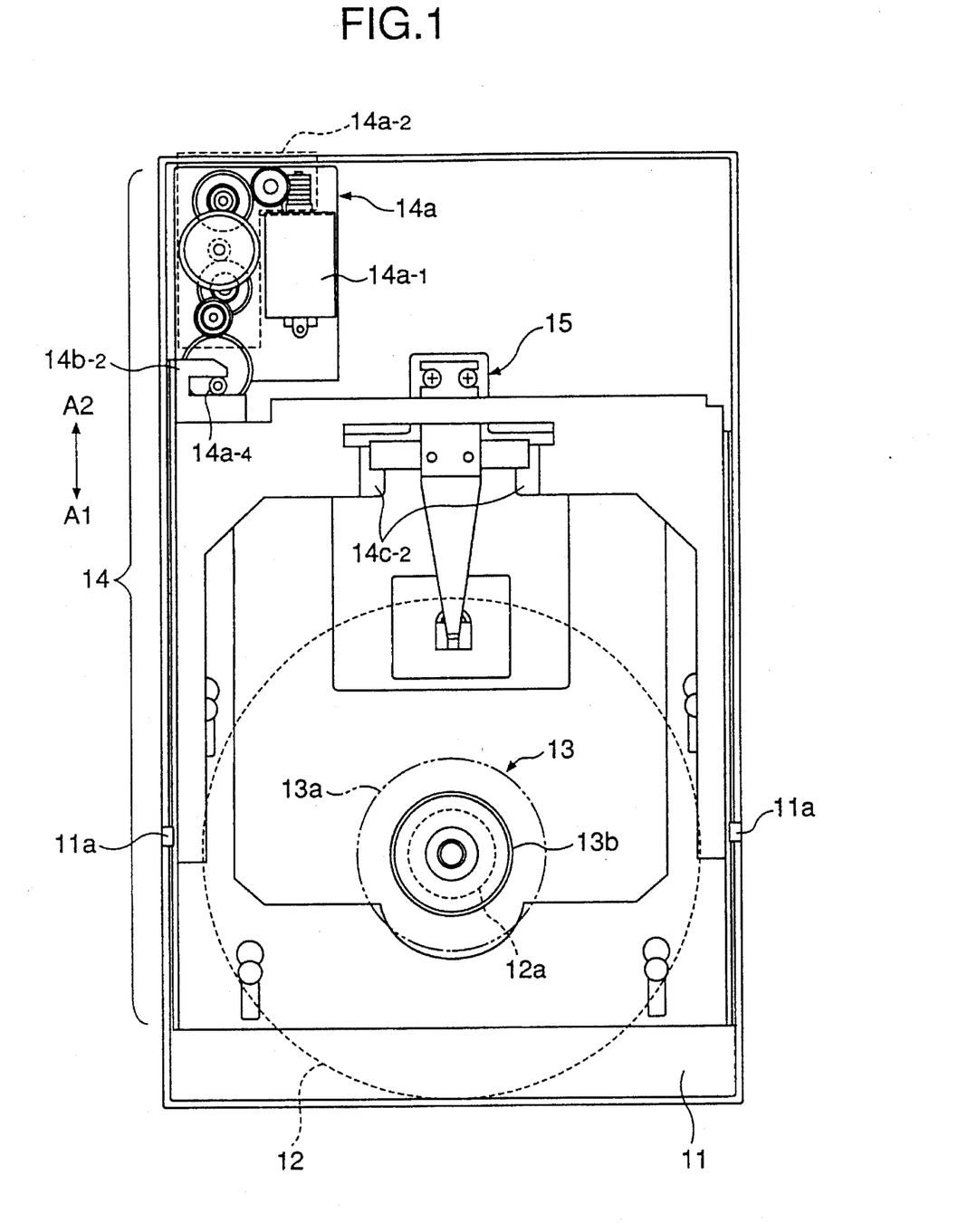
FIG. 1 is a plan view showing a magneto-optical disk apparatus to which a first embodiment of the head loading mechanism according to the present invention is applied.

A description will now be given, with reference to FIG. 1, of the first embodiment of the present invention. FIG. 1 shows a magneto-optical disk apparatus to which the present invention is applied. In FIG. 1, the magneto-optical disk apparatus has a frame 11 on which a driving unit 13, a disk positioning unit 14 and a head assembly 15 are mounted.

The driving unit 13 has a rotating shaft with which a center hole 12a of a magneto-optical disk 12 (indicated by a dotted line in FIG. 1) is connected, and the magneto-optical disk 12 is rotated by the driving unit 13 around this rotating shaft when information is recorded on or reproduced from the magneto-optical disk 12.

The disk positioning unit 14 positions the magneto-optical disk 12 in a read/write position in the disk apparatus shortly after the magneto-optical disk 12 is inserted into the disk apparatus. Information is recorded on the disk 12 or reproduced from the disk 12 when the disk 12 is positioned in the read/write position. Before the disk 12 is ejected from the disk apparatus, the disk positioning unit 14 raises the disk 12 from the read/write position to an insertion position in the disk apparatus.

The driving unit 13 has a spindle motor 13a and a turn table 13b fixed to the rotating shaft of the spindle motor 13a. When the magneto-optical disk 12 is positioned in the read/write position in the disk apparatus, the center hole 12a of the disk 12 is fitted onto the outer periphery of the turn table 13b so that the disk 12 is rotated on the turn table 13b by the driving unit 13.

The disk positioning unit 14 has a moving part 14a, a slider 14b, and a lifting part 14c. The moving part 14a includes a motor 14a-1, a reduction gear 14a-2 and an output gear 14a-3. The rotating force of the motor 14a-1 is transmitted to the output gear 14a-3 via the reduction gear 14a-2.

A pin 14a-4 is embedded in the rotating shaft of the output gear 14a-3, and this pin 14a-4 is arranged at an off-center position on the output gear 14a-3 deviating from the center of the rotating shaft of the output gear 14a-3. Thus, the pin 14a-4 on the output gear 14a-3 can move relative to the frame 11 in a direction indicated by the arrow A1 or A2 in FIG.1 when the output gear 14a-3 is rotated by the motor 14a-1.

Figure 3A:
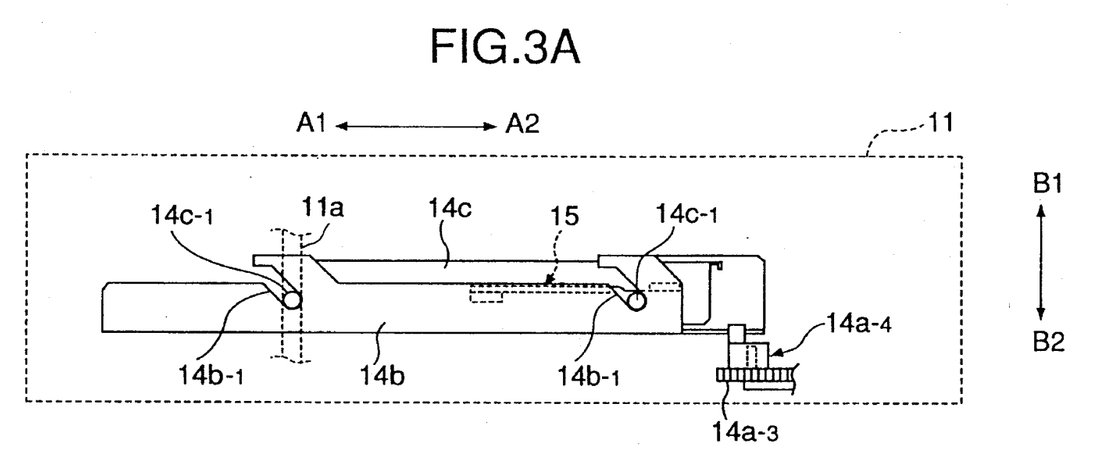
FIGS. 3A and 3B are side views showing loaded and unloaded positions of the head loading mechanism in FIG. 1.
Figure 3B:
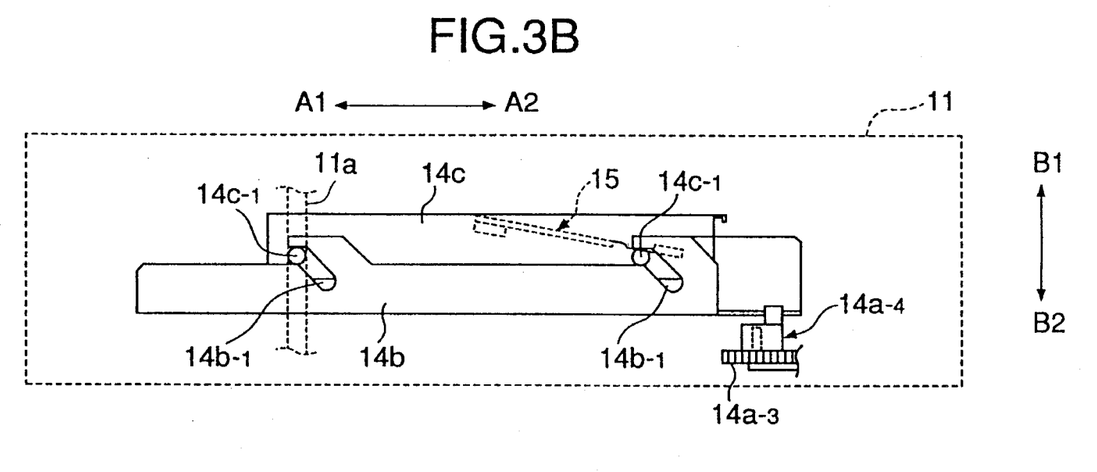

As shown in FIGS. 3A and 3B, the slider 14b has side surfaces on which a plurality of slanting grooves 14b-1 are formed; the two slanting grooves 14b-1 are formed on each of the side surfaces of the slider 14b. As shown in FIG. 1, the slider 14b has a rear end portion in which a pawl 14b-2 is formed. The pin 14a-4 of the moving part 14a is connected with the pawl 14b-2 of the slider 14b. The slider 14b is slidably arranged within the disk apparatus such that the slider 14b is movable relative to the frame 11 in the direction indicated by the arrow A1 or A2 in FIG. 1. When the pin 14a-4 is moved by the rotation of the output gear 14a-3, the slider 14b is moved in the direction indicated by the arrow A1 or A2 in FIG. 1 in response to the movement of the pin 14a-4.

Figure 4A:
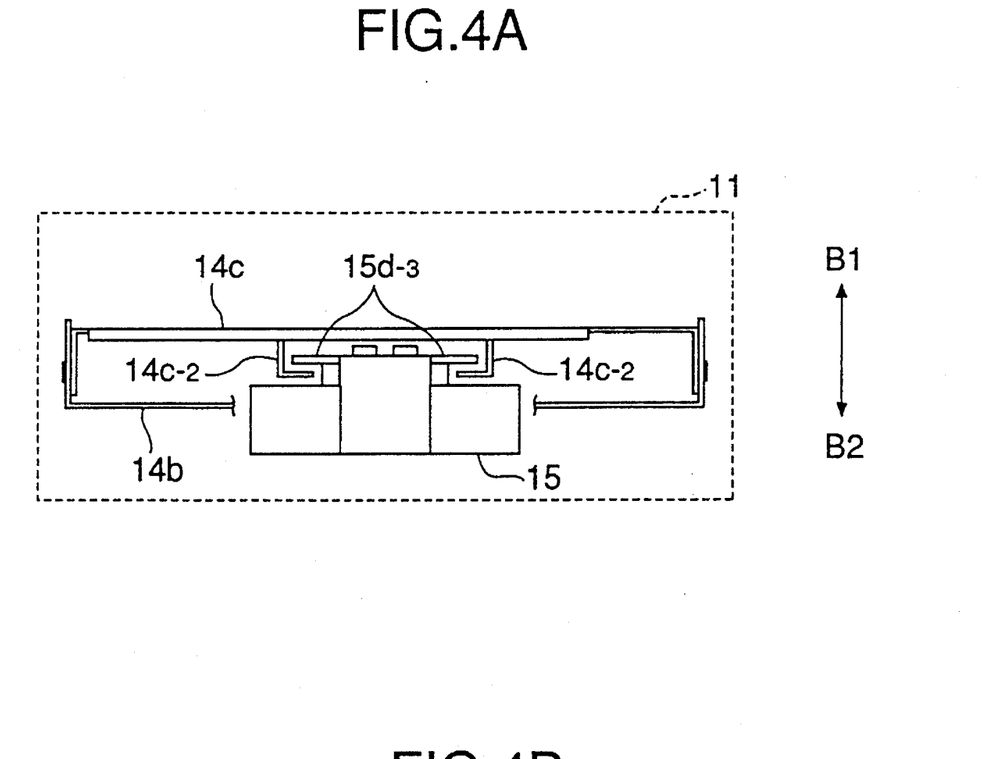
FIGS. 4A and 4B are rear views showing the loaded and unloaded positions of the head loading mechanism in FIG. 1.
Figure 4B:
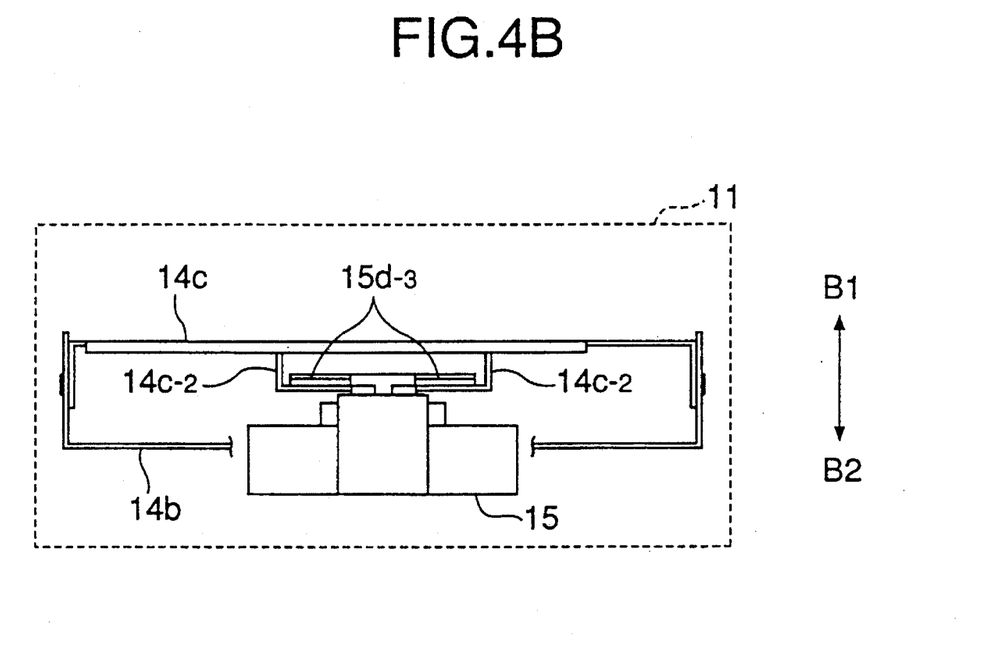

As shown in FIGS. 3A and 3B, the lifting part 14c has side surfaces on which a plurality of laterally projecting pins 14c-1 are formed; the two pins 14c-1 are formed on each of the side surfaces of the lifting part 14c at positions which the locations of the slanting grooves 14b-1 of the slider 14b correspond to. As shown in FIGS. 1, 4A and 4B, the lifting part 14c has a rear end portion in which a pair of connecting portions 14c-2 are formed. The laterally projecting pins 14c-1 of the lifting part 14c are engaged with the slanting grooves 14b-1 of the slider 14b, respectively. The connecting portions 14c-2 are engaged with the head assembly 15 when the disk 12 is placed in the insertion position after the disk has just been inserted into the disk apparatus or before the disk is ejected from the disk apparatus. In addition, two of the four pins 14c-1 of the lifting part 14c are engaged with two vertically extending guide grooves 11a on the side surfaces of the frame 11 as shown in FIG. 1. In FIGS. 3A and 3B, the location of one of the guide grooves 11a in the frame 11 is indicated by a dotted line.

Figure 2:
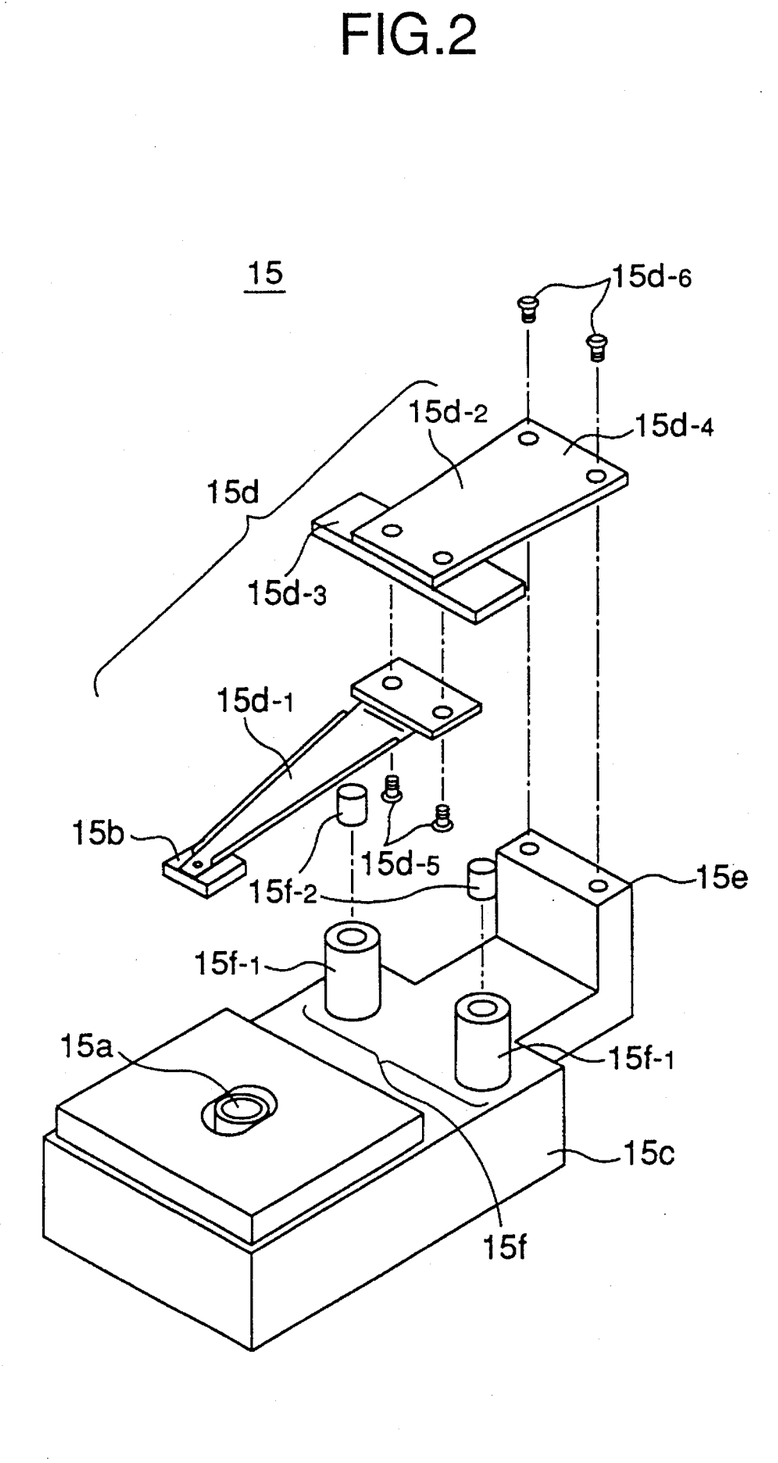
FIG. 2 is an exploded view showing a head assembly of the magneto-optical disk apparatus in FIG. 1

FIG. 2 shows the head assembly 15 of the disk apparatus in FIG. 1. As shown in FIG. 2, the head assembly 15 comprises an optical head 15a, a magnetic head 15b, a head carriage 15c, an arm 15d, a first supporting portion 15e, and a second supporting portion 15f.

In the head assembly 15 in FIG. 2, the optical head 15a includes a laser diode, a lens and other elements. A converging laser light beam is irradiated by the optical head 15a onto the bottom of the magneto-optical disk 12 in order to facilitate the magnetization of the disk 12 by the magnetic head 15b. The magnetic head 15b includes a slider, a yoke, a coil and other elements. The magnetic head 15b is used to record information on the magneto-optical disk 12 by varying the direction of magnetization of the disk material according to the data signal indicating the information.

In the head assembly 15 in FIG. 2, the head carriage 15c holds the optical head 15a and the magnetic head 15b. As the head carriage 15c is moved by a carriage drive mechanism (not shown) relative to the frame 11 in a radial direction of the magneto-optical disk 12, the optical head 15a and the magnetic head 15b can move on the magneto-optical disk 12 to a read/write position in the radial direction of the disk 12.

In the head assembly in FIG. 2, the arm 15d has a first arm portion 15d-1, a second arm portion 15d-2, a pair of laterally projecting portions 15d-3, and a base portion 15d-4. The first and second arm portions 15d-1 and 15d-2 are made of a flexible material which resiliently deforms in response to the applied force. The magnetic head 15b is secured to the leading edge of the first arm portion 15d-1, and the rear edge of the first arm portion 15d-1 is secured to the second arm portion 15d-2 via the projecting portions 15d-3 by fastening two machine screws 15d-5 thereto.

The base portion 15d-4 is formed at the rear end of the second arm portion 15d-2, and the base portion 15d-4 is secured to the head carriage 15 by fastening two machine screws 15d-6 to the first supporting portion 15e. Thus, the arm 15d having the magnetic head 15b at the leading edge of the arm 15d is secured to the head carriage 15c.

In the head assembly in FIG. 2, the second supporting portion 15f includes a pair of stoppers 15f-1 and a pair of permanent magnets 15f-2 secured to the stoppers. The stoppers 15f-1 are arranged on the head carriage 15c of the head assembly at positions which the projecting portions 15d-3 of the arm 15d are opposed to. The permanent magnets 15f-2 are embedded in the stoppers 15f-1 using an adhesive agent. As described above, in the head loading mechanism of the present invention, the connecting portions 14c-2 of the lifting part 14c are engaged with the projecting portions 15d-3 of the head assembly 15 when the magneto-optical disk 12 is raised from the read/write position to the insertion position and the magnetic head 15b is unloaded from the magneto-optical disk 12.

Next, a description will be given, with reference to FIGS. 3A through 4B, of the operation of the first embodiment of the head loading mechanism in FIGS. 1 and 2.

The pins 14c-1 of the lifting part 14c are engaged with the guide grooves 11a of the frame 11 and with the slanting grooves 14b-1 of the slider 14b. When the pins 14c-1 of the lifting part 14c are moved along these grooves 11a and 14b-1 of the frame 11 and the slider 14b, the lifting part 14c is raised and lowered relative to the slider 14b by the engagement of the pins 14c-1 with the grooves 11a and 14b-1 mentioned above.

Before the magneto-optical disk 12 is ejected from the disk apparatus, the slider 14b is moved by the moving part 14a, relative to the frame 11, in the direction indicated by the arrow A2. The lifting part 14c is then raised relative to the slider 14b by the engagement of the pins 14c-1 with the guide grooves 11a of the frame 11 and with the slanting grooves 14b-1 of the slider 14b.

FIG. 3A shows the lowered position of the lifting part 14c in which the magnetic head 15b is placed in the loaded position on the magneto-optical disk 12. FIG. 3B shows the raised position of the lifting part 14c in which the magnetic head 15b is placed in the unloaded position which is separate from the magneto-optical disk 12. As described above, after the magnetic head 15b is unloaded from the magneto-optical disk 12, the magneto-optical disk 12 is ejected from the disk apparatus.

When the magneto-optical disk 12 is inserted into the disk apparatus, a disk cartridge containing the magneto-optical disk 12 is pushed by an operator from the insertion opening into the disk apparatus. The slider 14b is moved relative to the frame 11 toward the direction indicated by the arrow A1. The lifting part 14c is lowered relative to the slider 14b by the engagement of the pins 14c-1 with the grooves 11a and 14b-1 mentioned above. The magneto-optical disk 12 is placed in the read/write position on the turn table 13b, while the magnetic head 15b is placed in the loaded position on the magneto-optical disk 12.

Figure 5A:
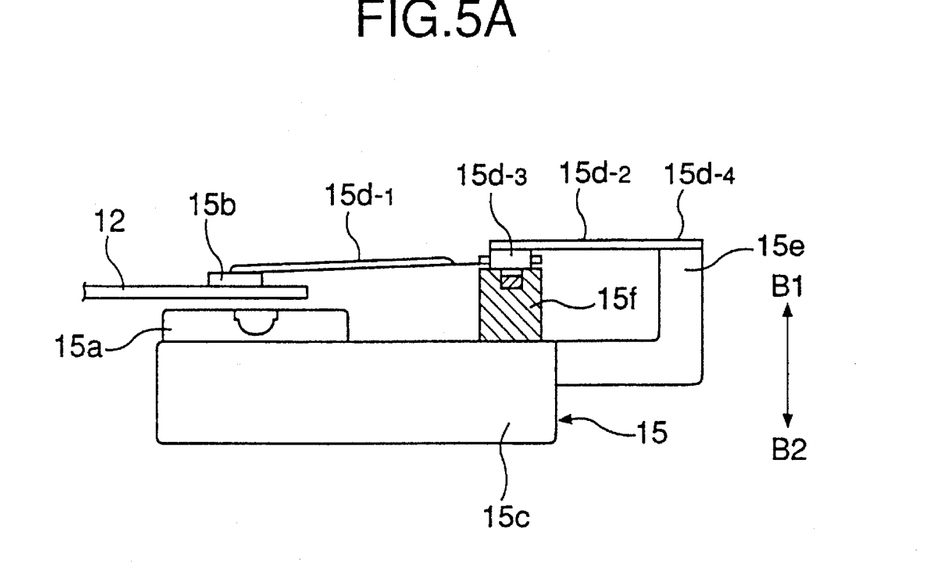
FIGS. 5A and 5B are side views showing the loaded and unloaded positions of the head assembly in FIG. 2.

Next, a description will be given, with reference to FIGS. 5A and 5B, of the unloading operation of the head loading mechanism in FIGS. 1 and 2.

In the event that the magneto-optical disk 12 is placed in the read/write position in the disk apparatus, the projecting portions 15d-3 of the arm 15d are attracted by the permanent magnets 15f-2 on the stoppers 15f-1 so that the projecting portions 15d-3 are supported on the second supporting portion 15f. As shown in FIG. 5A, the magnetic head 15b at the leading edge of the arm 15d is placed in the loaded position on the magneto-optical disk 12. More specifically, the magnetic head 15b is held slightly above the upper surface of the magneto-optical disk 12 in a floating manner since the first arm portion 15d-1 resiliently deforms and the projecting portions 15d-3 are supported on the second supporting portion 15f. In addition, the vibration of the magnetic head 15b produced during the recording or reproducing of data with the disk 12 is absorbed due to the resilient deformation of the first arm portion 15d-1.

In the event that the magneto-optical disk 12 is returned back to the insertion position from the read/write position, the connecting portions 14c-2 of the lifting part 14c are engaged with the projecting portions 15d-3 of the arm 15d. As the lifting part 14c is raised relative to the slider 14b, the arm 15d is raised in the direction indicated by the arrow B1 in FIG. 5B through the engagement of the projecting portions 15d-3 with the connecting portions 14c-2.

Figure 5B:
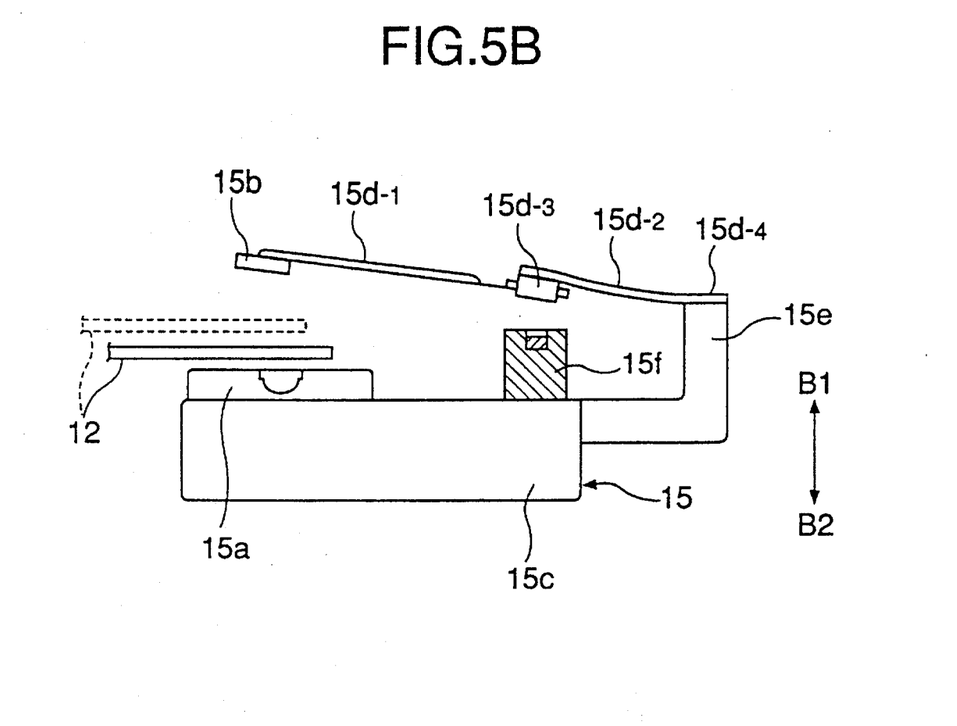

As shown in FIG. 5B, the projecting portions 15d-3 of the arm 15d are separated from the second supporting portion 15f of the head assembly 15 against the attractive force of the permanent magnets 15f-2. As the second arm portion 15d-2 at this time resiliently deforms, the arm 15d is rotated around the first supporting portion 15e, and the magnetic head 15b at the leading edge of the first arm portion 15d-1 is placed in the unloaded position in which the head 15b is separated from the magneto-optical disk 12.

In the first embodiment described above, in the event that the magneto-optical disk 12 is placed in the read/write position, the arm 15d to which the magnetic head 15b is secured is supported on the second supporting portion 15f while the magnetic head 15b is placed in the loaded position on the magneto-optical disk.

The projecting portions 15d-3 are attracted by the permanent magnets 15f-2 in the direction B2, and the head loading mechanism can be highly rigid. The head loading mechanism has a simple structure, and the number of parts required to form the head loading mechanism is relatively small. Thus, the manufacturing cost can be reduced from that of the disclosed conventional devices.

In the first embodiment described above, in the event that the magneto-optical disk 12 is placed in the insertion position, the magnetic head 15b is placed in the unloaded position in which it is separate from the magneto-optical disk 12. The unloading of the magnetic head 15b from the disk 12 is made by using the resilient deformation of the second arm portion 15d-2 due to the engagement of the connecting portions 14c-2 with the projecting portions 15d-3. The lifting force by the lifting part 14c does not act on the first arm portion 15d-1 when the magnetic head 15b is unloaded. Even if the disk 12 is changed many times, the rigidity of the flexible member of the arm to which the magnetic head 15b is secured will not be degraded.

Thus, the head loading mechanism of the first embodiment can be highly rigid and lightweight so as to realize the magnetic head having a high-speed access to the magneto-optical disk.

Next, a description will be given, with reference to FIGS. 6 through 7B, of a second embodiment of the head loading mechanism according to the present invention.

Figure 6:
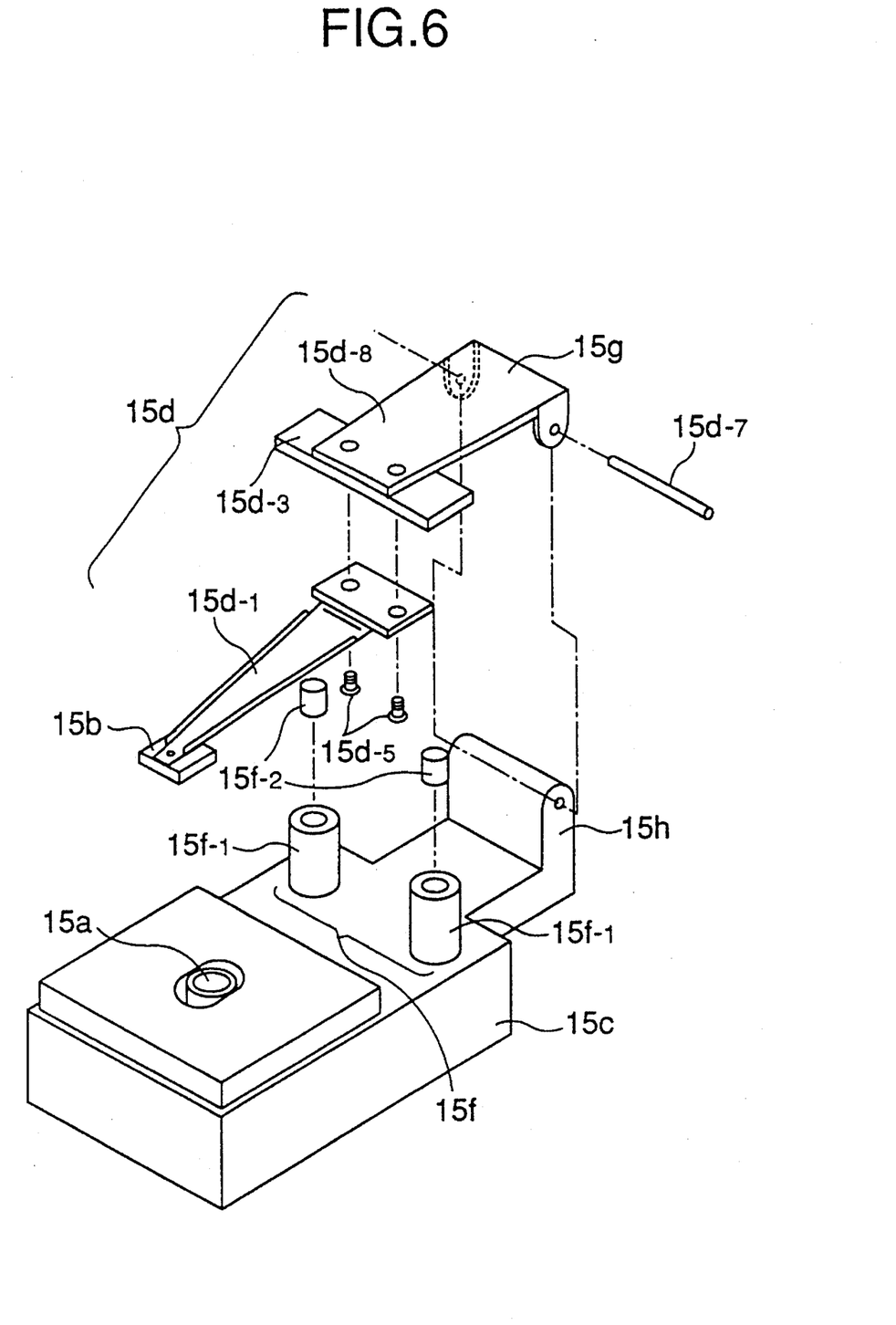
FIG. 6 is an exploded view showing a head assembly of a second embodiment of the head loading mechanism according to the present invention.

FIG. 6 shows a head assembly of the second embodiment of the head loading mechanism. In FIG. 6, the parts which are the same as corresponding parts in FIG. 2 are designated by the same reference numerals and a description thereof will be omitted. It is readily understood that the head assembly shown in FIG. 6 is applicable to the disk apparatus in FIG. 1, and that the features or advantages of the second embodiment are essentially the same as those of the first embodiment previously described.

In the head assembly of the second embodiment in FIG. 6, the arm 15d has a modified second arm portion 15d-8. This second arm portion 15d-8 is made of a rigid material that can hardly deform in response to the applied force. The magnetic head 15b is secured to the leading edge of the first arm portion 15d-1, and the rear edge of the first arm portion 15d-1 is secured to this second arm portion 15d-8 via the projecting portions 15d-3 by fastening the machine screws 15d-5 thereto.

At the rear end of the second arm portion 15d-8 mentioned above, a modified base portion 15g is formed. The base portion 15g has downwardly projecting portions on its side edges. At the rear end of the head carriage 15c, a modified second supporting portion 15h is formed. The second supporting portion 15h has a horizontally and laterally extending hole. The base portion 15g of the arm 15d is rotatably supported on this second supporting portion 15h via a shaft 15d-7. This shaft 15d-7 is inserted into the projecting portions of the base portion 15g and the hole of the second supporting portion 15h.

Figure 7A:
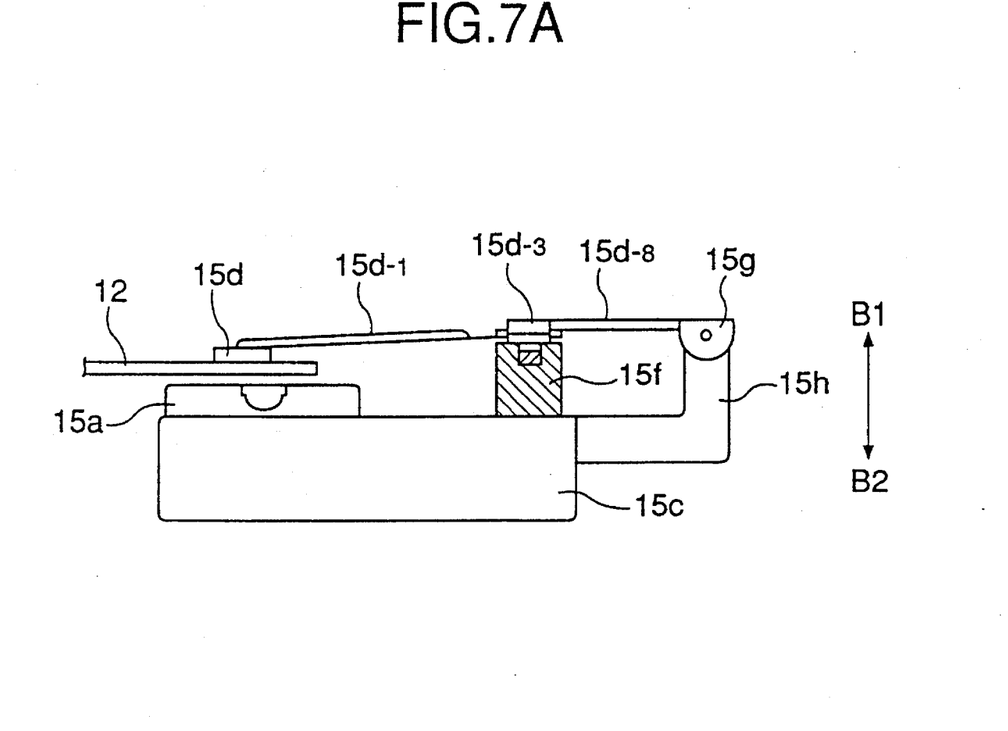
FIGS. 7A and 7B are sectional views showing loaded and unloaded positions of the head assembly in FIG. 6.
Figure 7B:
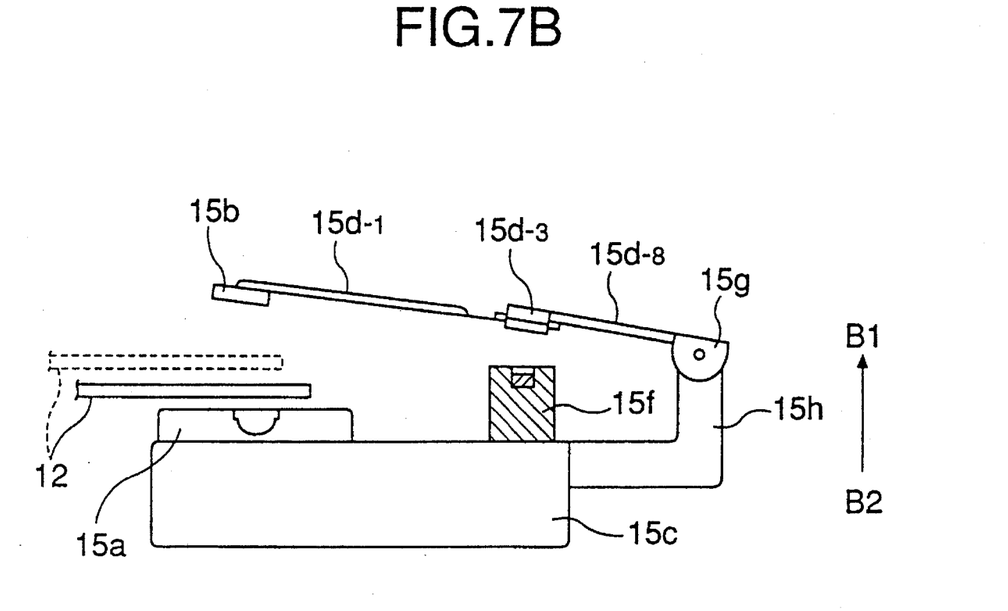

Since the arm 15d is rotatably supported on the second supporting portion 15h of the head carriage 15c, the second arm portion 15d-8 can hardly deform when the arm 15d is raised or lowered relative to the head carriage 15c as shown in FIGS. 7A and 7B. In comparison with the first embodiment, the head loading mechanism of the second embodiment is more rigid, and the operating life of this head loading mechanism is longer.

Further, the present invention is not limited to the above described embodiments, and variations and modifications may be made without departing from the scope of the present invention.

What is claimed is:

1. A head loading mechanism for placing a head of a disk apparatus into a loaded position proximate to a recording medium disk within the disk apparatus when information is recorded on or reproduced from the disk, and for placing the head in an unloaded position to separate the head from the disk when the disk is ejected from the disk apparatus, said head loading mechanism comprising:

arm means having the head mounted at a free end portion of the arm means, said arm means longitudinally extending in a radial direction of the disk toward the center of the disk, said arm means having a base portion at the other end thereof a pair of laterally projecting portions projecting normal to the longitudinal extension of said arm means intermediate said free end portion and said base portion, said arm means having a first arm portion extending between the free end portion and the laterally projecting portions, and a second arm portion extending between the laterally projecting portions and the base portion;

a head carriage;

first supporting means, provided on said head carriage, for supporting said base portion of said arm means on the head carriage;

second supporting means, provided on said head carriage, for magnetically attracting and supporting said laterally projecting portions of said arm means on the head carriage to place the head in the loaded position when the disk is placed in a first position in which information is recorded on or reproduced from the disk; and arm raising means for rotating said arm means around the base portion of the arm means supported by said first supporting means to move the head to the unloaded position when the disk is moved from the first position to a second position, said arm raising means and said second supporting means comprising separate elements of the head loading mechanism, said first arm portion of said arm means being made of a flexible material that is resiliently deformable so that said first arm portion is rotatable around the laterally projecting portions when the latter are supported by said second supporting means thereby to place the head in the loaded position.

2. A head loading mechanism according to claim 1, wherein said second supporting means comprises a pair of stoppers provided on said head carriage and a pair of permanent magnets embedded in the stoppers, said stoppers being arranged at positions which are aligned with, but opposed to, said laterally projecting portions of the arm means, said laterally projecting portions being attracted by said permanent magnets when the disk is placed in the first position.

3. A head loading mechanism according to claim 1, further comprising disk positioning means for placing the disk in the first position after the disk is inserted into the disk apparatus, and for moving the disk from the first position to the second position before the disk is ejected from the disk apparatus.

4. A head loading mechanism according to claim 3, wherein said arm raising means is arranged on said disk positioning means such that the arm raising means is engaged with the laterally projecting portions of the arm means when the disk is moved by said disk positioning means from the first position to the second position.

5. A head loading mechanism according to claim 1, wherein both said first arm portion and said second arm portion are made of a flexible material that resiliently deforms in response to an applied force.

6. A head loading mechanism according to claim 1, wherein said second arm portion is made of a rigid, substantially non-deformable material.

7. A head loading mechanism according to claim 6, wherein said base portion of said arm means comprises a shaft and a pair of downwardly projecting portions on side edges of the base portion, said first supporting means includes a hole, and said base portion is rotatably supported on the first supporting means by inserting said shaft into said hole.

8. A head loading mechanism according to claim 1, wherein said head is a magnetic head and wherein said disk apparatus comprises a head assembly having said magnetic head mounted on said arm means and an optical head mounted on said head carriage, and wherein said which heads carry out the recording and reproducing of information with a magneto-optical disk placed in the first position.

* * * * *